US012781875B2

(12) United States Patent
Chen et al.

(10) Patent No.: US 12,781,875 B2
(45) Date of Patent: Nov. 3, 2026

(54) METHOD AND DEVICE FOR MEASURING VALVE CHARACTERISTIC PARAMETERS

(71) Applicant: Siemens Schweiz AG, Zürich (CH)

(72) Inventors: Zhi Min Chen, Beijing (CN); Shun Jie Fan, Beijing (CN); Bin Zhang, Beijing (CN); Cheng Pan, Beijing (CN)

(73) Assignee: SIEMENS SCHWEIZ AG, Zurich (CH)

( * ) Notice: Subject to any disclaimer, the term of this patent is extended or adjusted under 35 U.S.C. 154(b) by 289 days.

(21) Appl. No.: 18/693,394

(22) PCT Filed: Sep. 7, 2022

(86) PCT No.: PCT/IB2022/058422

§ 371 (c)(1),
(2) Date: Mar. 19, 2024

(87) PCT Pub. No.: WO2023/052875

PCT Pub. Date: Apr. 6, 2023

(65) Prior Publication Data

US 2024/0384813 A1 Nov. 21, 2024

(30) Foreign Application Priority Data

Sep. 24, 2021 (CN) .......................... 202111124284.1

(51) Int. Cl.
*F16K 37/00* (2006.01)

(52) U.S. Cl.
CPC ................................ *F16K 37/0083* (2013.01)

(58) Field of Classification Search
CPC ................................................... F16K 37/0083
(Continued)

(56) References Cited

U.S. PATENT DOCUMENTS 4,879,901 A 11/1989 Leon ............................... 73/168
5,140,853 A 8/1992 Branam .......................... 73/168
(Continued)

FOREIGN PATENT DOCUMENTS

CN 102 472 410 5/2014 ............. F16K 37/00
CN 107 701 782 2/2018 ............ F16K 31/04
(Continued)

OTHER PUBLICATIONS

Search Report for International Application No. PCT/IB2022/058422, 15 pages, Dec. 20, 2022.
(Continued)

*Primary Examiner* — Nathaniel T Woodward
(74) *Attorney, Agent, or Firm* — Slayden Grubert Beard PLLC

(57) ABSTRACT

Various embodiments of the teachings herein include a method for measuring valve characteristic parameters of a valve actuator. An example method includes: resetting the push rod to a top end position; driving the push rod; measuring the DC drive current in real time; recording a first position of the push rod at the start of a first abrupt change in the DC drive current when the first abrupt change in the DC drive current is detected and lasts for more than a first preset time period; continuing to drive the push rod and measure the DC drive current in real time; recording a second position of the push rod at the start of a second abrupt change; and calculating the stroke length of the valve based on the first position and the second position.

9 Claims, 5 Drawing Sheets

(58) Field of Classification Search
USPC .............................................................. 73/168
See application file for complete search history.

(56) References Cited

U.S. PATENT DOCUMENTS

| | | | | |
|---|---|---|---|---|
| 2011/0048556 | A1 | 3/2011 | Carter | 137/559 |
| 2013/0056658 | A1* | 3/2013 | Borchgrevink | E21B 34/02 251/129.01 |
| 2017/0122306 | A1 | 5/2017 | Choi et al. | 417/44.2 |
| 2017/0328489 | A1 | 11/2017 | Beck | F16K 31/02 |
| 2019/0093545 | A1 | 3/2019 | Ammler | F01P 7/14 |
| 2020/0072373 | A1 | 3/2020 | Noboa | F16K 31/046 |
| 2020/0292618 | A1 | 9/2020 | Maucher | |
| 2020/0355295 | A1 | 11/2020 | Flandin et al. | |
| 2020/0378518 | A1* | 12/2020 | Schwarz | F16K 31/046 |
| 2021/0285681 | A1 | 9/2021 | Jarabo | F24F 11/84 |

FOREIGN PATENT DOCUMENTS

| | | | |
|---|---|---|---|
| CN | 208 587 507 | 3/2019 | F16K 1/22 |
| CN | 111688659 A | 9/2020 | |
| CN | 112 728 195 | 4/2021 | F16K 31/04 |
| IN | 202034020519 A | 5/2020 | |
| JP | H10 102997 | 4/1998 | E21D 11/40 |
| JP | 2001145217 A | 5/2001 | |
| KR | 1020170049278 | 5/2017 | |
| WO | 2017 148784 | 9/2017 | F16D 13/72 |

OTHER PUBLICATIONS

Korean Notice of Allowance, Application No. 10-2024-7012903, 3 pages.

Chinese Notice of Issuance, Application No. 202111124284.1, 4 pages.

* cited by examiner

METHOD AND DEVICE FOR MEASURING VALVE CHARACTERISTIC PARAMETERS

CROSS-REFERENCE TO RELATED APPLICATIONS

This application is a U.S. National Stage Application of International Application No. PCT/IB2022/058422 filed Sep. 7, 2022, which designates the United States of America, and claims priority to CN application Ser. No. 20/211, 1124284.1 filed Sep. 24, 2021, the contents of which are hereby incorporated by reference in their entirety.

TECHNICAL FIELD

The present disclosure in general relates to the field of valve controllers. Various embodiments of the teachings herein include methods and/or devices for measuring valve characteristic parameters of a valve actuator.

BACKGROUND

Valves are widely used in heating, ventilation, and air conditioning systems (HVAC). A valve actuator controls flow in a duct, pipe, or other conduit by controlling the position of a valve. Different valves have different sizes, stroke lengths, seal types, dead zone lengths, etc. Typically, a valve is controlled by a dedicated valve controller, and there is no need to measure the characteristic parameters of the valve (stroke length, dead zone length, etc.). Valve controls of different types or even with different characteristic parameters cannot be used interchangeably. Some manufacturers use mechanical means such as flaps to increase the versatility of valve actuators, but there is still a huge limitation.

SUMMARY

To solve the above technical problems, the present disclosure teaches methods and devices for measuring valve characteristic parameters, so as to improve the versatility of valve actuators. For example, some embodiments include a method for measuring valve characteristic parameters of a valve actuator, wherein the valve characteristic parameters comprise a stroke length of the valve, the valve actuator is used to drive the valve and comprises a push rod driven by a motor, the push rod is adapted to push a valve rod of the valve, and the motor is connected to a current sensor, which is adapted to measure a DC drive current flowing into the motor, and the measuring method comprises: resetting the push rod to a top end position; driving the push rod to push the valve rod, measuring the DC drive current in real time, and recording a first position of the push rod at the start of a first abrupt change in the DC drive current when the first abrupt change in the DC drive current is detected and lasts for more than a first preset time period; continuing to drive the push rod to push the valve rod and measure the DC drive current in real time, and recording a second position of the push rod at the start of a second abrupt change in the DC drive current when the second abrupt change in the DC drive current is detected and lasts for more than a second preset time period; calculating the stroke length of the valve based on the first position and the second position. For this, a current sensor is used to measure the DC drive current of the motor in real time, and the DC drive current curve is used to determine the characteristic parameter of the valve, thereby making it possible to use the valve actuator in valves of different types.

In some embodiments, the valve characteristic parameters further comprise a dead zone length, and the measuring method further comprises: continuing to drive the push rod to push the valve rod and measure an output driving force of the motor in real time, recording a third position of the push rod when the output driving force reaches a preset output force, and calculating the dead zone length of the valve based on the second position and the third position. For this, the DC drive current curve may be used to determine the dead zone length of the valve, thereby making it possible to use the valve actuator in valves of different types.

In some embodiments, the valve actuator also has a position sensor, which is used to detect the drive shaft position of the motor, and the measuring method comprises: measuring the drive shaft position of the motor by the position sensor, and converting the drive shaft position to a position of the push rod. For this, the position of the push rod may be obtained through the position of the drive shaft of the motor, which reduces the complexity of the structure.

In some embodiments, the measuring method comprises: measuring the DC drive current in real time, calculating an average change rate of the DC drive current, and identifying the first abrupt change and/or the second abrupt change in the DC drive current when an instantaneous change rate is greater than the average change rate. For this, abrupt changes in the DC drive current are measured.

In some embodiments, the measuring method comprises: repeating the measuring method a plurality of times, and taking the measurement result as a characteristic parameter of the valve when the results of the plurality of times of measurement in the measuring method are consistent. For this, a plurality of measurements can improve the accuracy of the measurement result.

As another example, some embodiments include a device for measuring valve characteristic parameters of a valve actuator, wherein the valve characteristic parameters comprise a stroke length of the valve, the valve actuator is used to drive the valve and comprises a push rod driven by a motor, the push rod is adapted to push a valve rod of the valve, and the motor is connected to a current sensor, which is adapted to measure a DC drive current flowing into the motor, and the measuring device comprises: a resetting module, which resets the push rod to a top end position; a first recording module, which, when the push rod is driven to push the valve rod and the DC drive current is measured in real time, records a first position of the push rod at the start of a first abrupt change in the DC drive current when the first abrupt change in the DC drive current is detected and lasts for more than a first preset time period; a second recording module, which, when the push rod continues to be driven to push the valve rod and the DC drive current continues to be measured in real time, records a second position of the push rod at the start of a second abrupt change in the DC drive current when the second abrupt change in the DC drive current is detected and lasts for more than a second preset time period; a calculating module, which calculates the stroke length of the valve based on the first position and the second position.

In some embodiments, the valve characteristic parameters further comprise a dead zone length, and the measuring device further comprises: when the push rod continues to be driven to push the valve rod and an output driving force of the motor is measured in real time, recording a third position of the push rod when the output driving force reaches a preset output force, and calculating the dead zone length of the valve based on the second position and the third position.

In some embodiments, the valve actuator also has a position sensor, which is used to detect the drive shaft position of the motor, and the measuring device comprises: measuring the drive shaft position of the motor by the position sensor, and converting the drive shaft position to a position of the push rod.

In some embodiments, the measuring device comprises: measuring the DC drive current in real time, calculating an average change rate of the DC drive current, and identifying the first abrupt change and/or the second abrupt change in the DC drive current when an instantaneous change rate is greater than the average change rate.

In some embodiments, the measuring device comprises: repeating the functions of the measuring device a plurality of times, and taking the measurement result as a characteristic parameter of the valve when the results of the plurality of times of measurement by the measuring device are consistent.

As another example, some embodiments include a valve actuator, which has one or more measuring device as described herein.

As another example, some embodiments include an electronic device, comprising a processor, a memory and an instruction stored in the memory, wherein the instruction, when executed by the processor, implements one or more of the methods described herein.

As another example, some embodiments include a computer-readable storage medium, with a computer instruction stored therein, which, when run, executes one or more of the methods as described herein.

BRIEF DESCRIPTION OF THE DRAWINGS

The following drawings are only intended to illustrate and explain teachings of the present disclosure schematically, and do not limit the scope thereof. In the drawings.

REFERENCE SIGNS IN THE DRAWINGS

Figure 1:
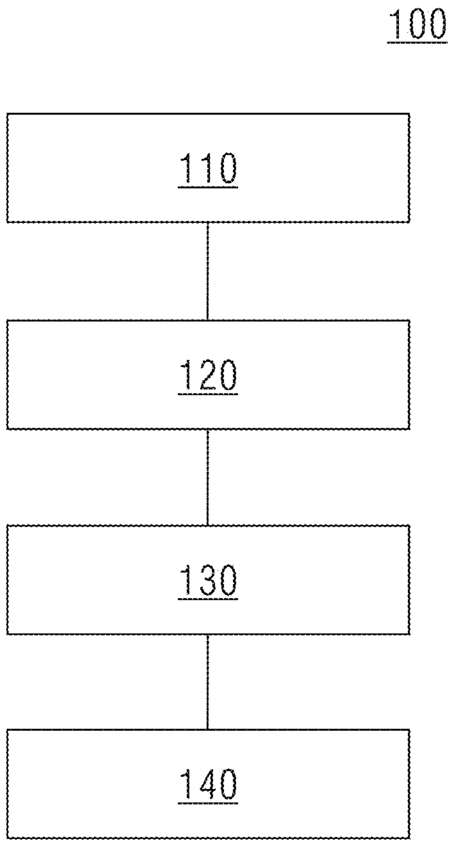
FIG. 1 is a flowchart of an example measuring method incorporating teachings of the present disclosure.

100 Measuring method
110-140 Steps
210 Valve actuator
211 Power supply
212 Current sensor
213 Motor
214 Position sensor
215 Processing unit
216 Speed change mechanism
217 Push rod
220 Valve
221 Valve rod
D Valve closing direction
P1 First position
P2 Second position
400 Measuring module
410 Resetting module
420 First recording module
430 Second recording module
440 Calculating module
500 Electronic device
510 Processor
520 Memory

DETAILED DESCRIPTION

In order to have a clearer understanding of the technical features, purpose and effects of the present invention, some example embodiments of the teachings of the present disclosure will be described below with reference to the drawings. In the following description, many specific details are provided. However, the teachings may also be implemented in other ways different from those described herein. Therefore, the scope off the present disclosure is not limited to the specific embodiments disclosed below.

As shown in this patent application and the claims, unless the context clearly dictates otherwise, terms "a", "an", "one" and/or "the" are not intended to be specific in the singular and may include the plural. Generally, terms "comprising" and "including" only imply that the clearly identified steps and elements are included, these steps and elements do not constitute an exclusive list, and the method or device may also include other steps or elements.

Figure 2:
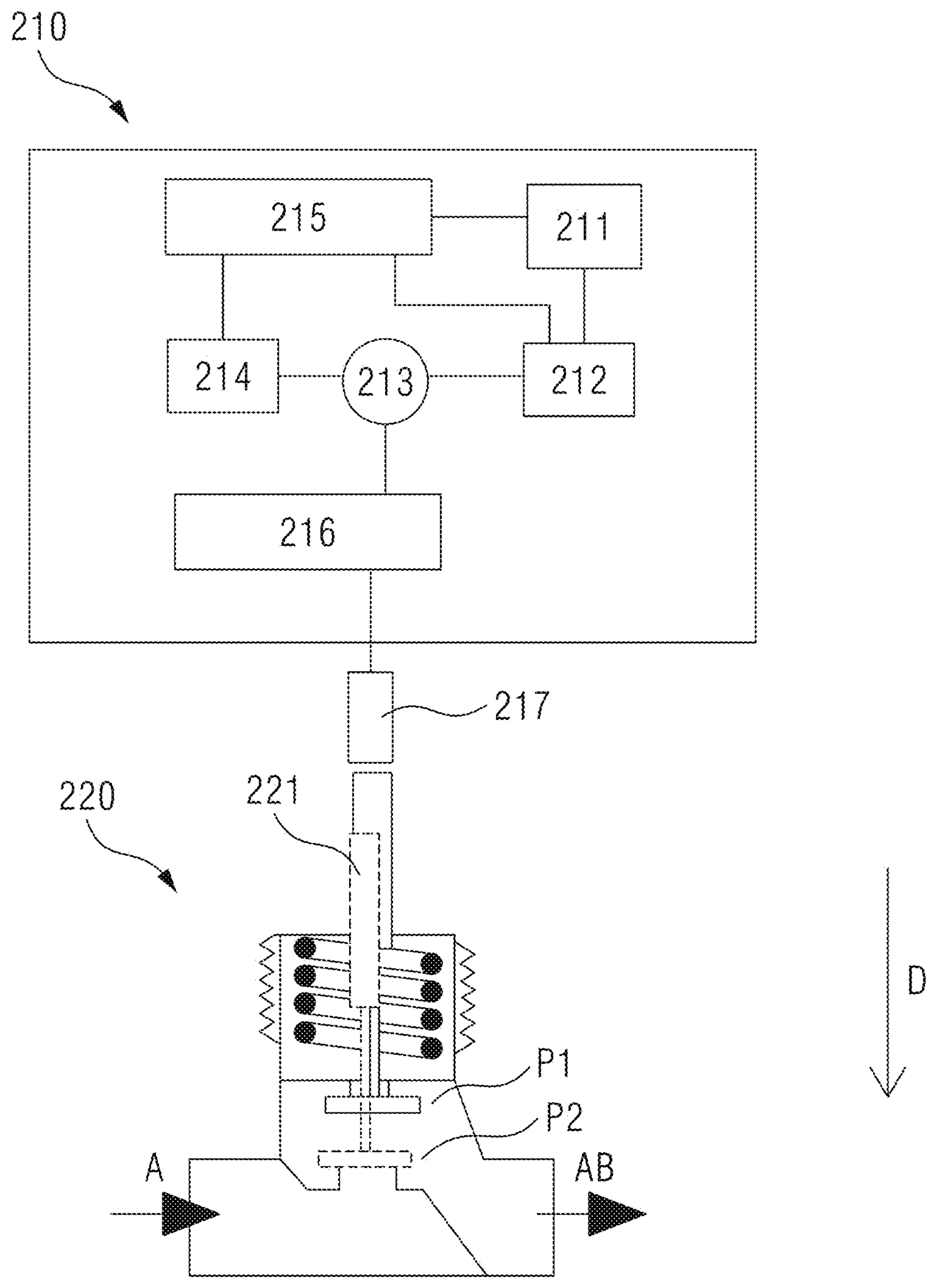
FIG. 2 is a schematic diagram of an example valve actuator and an example valve incorporating teachings of the present disclosure.

FIG. 2 is a schematic diagram of a valve actuator 210 and a valve 220 incorporating teachings of the present disclosure. The valve actuator 210 is used to drive the valve 220. The valve 220 may be a normally open valve, which is normally open by default, i.e., in the fully open position, and the valve 220 is partially opened or closed under the drive of the valve actuator 210. The valve 220 may also be a normally closed valve, which is normally closed by default, i.e., in the fully closed position, and the valve 220 is partially or fully opened under the drive of the valve actuator 210. To simplify the description, a normally open valve will be used as an example below.

The valve actuator 210 comprises a power supply 211, a current sensor 212, a motor 213, a position sensor 214, a processing unit 215, a speed change mechanism 216 and a push rod 217. The power supply 211 is used to supply power to the motor 213, and the current sensor 212 is arranged on the circuit between the power supply 211 and the motor 213. For this purpose, the current sensor 212 is adapted to measure the DC drive current flowing into the motor 213. The motor 213 may be an integrated motor, i.e., integrated with the actuator, which can reduce the volume and cost of the motor 213. The position sensor 214 is connected to the motor 213 and the processing unit 215, and is adapted to measure the drive shaft position of the motor 213 and send the drive shaft position to the processing unit 215. The processing unit 215 is connected to the current sensor 212 and the position sensor 214, to receive and process the data sent by the current sensor 212 and the position sensor 214. The motor 213, the speed change mechanism 216 and the push rod 217 are connected in sequence, so that the push rod 217 can move under the drive of the motor 213. The push rod 217 is adapted to push the valve rod 221 of the valve 220.

The valve 220 is used to enable, disable or regulate the flow of fluid in a pipeline. The valve comprises a push rod 221 which is adapted to move in the closing direction D. The valve 220 is fully opened when the valve rod 221 is at the top end position P1, and the valve 220 is closed when the valve rod 221 moves along the closing direction D to contact the bottom end position P2. The distance between the top end position P1 and the bottom end position P2 is the stroke length of the valve 220. For elastic materials, the valve rod 221 can continue to move from the position where it is in contact with the bottom end position P2 to the stop position P3 (not shown in the figure). The distance between the bottom end position P2 and the stop position P3 is the dead zone length of the valve 220. Different types of valves 220 usually have different stroke lengths and dead zone lengths, and valves of different types or even different characteristic parameters cannot be used interchangeably. This makes it possible to use the actuator in different types of valves by measuring the stroke length and dead zone length of the valve.

Some examples include a method for measuring valve characteristic parameters of a valve actuator wherein the valve characteristic parameters comprise the stroke length of a valve. FIG. 1 is a flowchart of an example measuring method 100 incorporating teachings of the present disclosure. As shown in FIG. 1, the measuring method comprises:

Step 110, resetting the push rod to a top end position. The push rod 217 is probably not in the top end position initially and is reset to the top end position. When the push rod 217 reaches the top end position from a middle position, the DC drive current detected by the current sensor 212 will change abruptly. By detecting an abrupt change in the DC drive current, it can be determined that the push rod 217 has reached the top end position.

Figure 3:
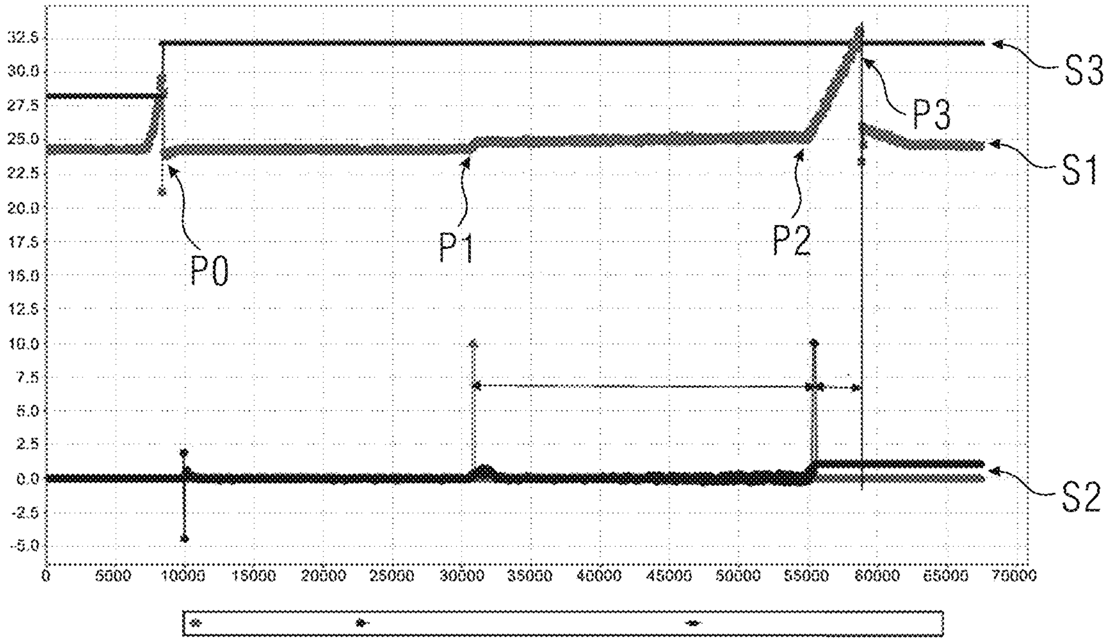
FIG. 3 is a schematic diagram of a DC drive current incorporating teachings of the present disclosure.

FIG. 3 is a schematic diagram of the DC drive current according to one embodiment of the present invention, wherein the abscissa is the time, in milliseconds (ms), and the ordinate is the DC drive current, in milliamperes (mA). S1 is the curve of the DC drive current, and S2 is the curve of the rate of change of the DC drive current. As shown in FIG. 3, when the push rod 217 reaches the top end position P0, the DC drive current curve S1 suddenly rises, which is also reflected in the change rate curve S2 of the DC drive current.

Step 120, driving the push rod to push the valve rod, measuring the DC drive current in real time, and recording a first position of the push rod at the start of a first abrupt change in the DC drive current when the first abrupt change in the DC drive current is detected and lasts for more than a first preset time period.

The push rod 217 is driven to move toward the closing direction D of the valve 220, and the DC drive current is measured in real time. As shown in FIG. 3, when the DC drive current has the first abrupt change that lasts for more than the first preset time period, the position of the push rod at the start of the first abrupt change in the DC drive current is where the push rod 217 and the valve rod 221 start to contact, i.e., the valve rod 221 is in the top end position, until the push rod 217 is fully joined with the valve rod 221, and the first position VP1 of the push rod at the start of the first abrupt change in the DC drive current is recorded. In some embodiments, the position sensor 214 can detect the drive shaft position of the motor 213 and convert the drive shaft position into the first position VP1 of the push rod 217. In some embodiments, by measuring the DC drive current in real time and calculating the average rate of change (for example, the root mean square) of the DC drive current, the first abrupt change in the first DC drive current is identified when the instantaneous rate of change is greater than the average rate of change.

Step 130, continuing to drive the push rod to push the valve rod and measure the DC drive current in real time, and recording a second position of the push rod at the start of a second abrupt change in the DC drive current when the second abrupt change in the DC drive current is detected and lasts for more than a second preset time period.

The push rod 217 continues to be driven to move toward the closing direction D of the valve 220, and the DC drive current is measured in real time. As shown in FIG. 3, when the DC drive current has the second abrupt change that lasts for more than the second preset time period, the position of the push rod at the start of the second abrupt change in the DC drive current is where the valve rod 221 comes into contact with the bottom end position, and the second position VP2 of the push rod at the start of the second abrupt change in the DC drive current is recorded.

In some embodiments, the position sensor can detect the drive shaft position of the motor and convert the drive shaft position into the position of the push rod. In some embodiments, the position sensor 214 can detect the drive shaft position of the motor 213 and convert the drive shaft position into the second position VP2 of the push rod 217. In some embodiments, by measuring the DC drive current in real time and calculating the average rate of change (for example, the root mean square) of the DC drive current, the second abrupt change in the first DC drive current is identified when the instantaneous rate of change is greater than the average rate of change.

Step 140, calculating the stroke length of the valve based on the first position and the second position. The first position VP1 is the position where the push rod 217 and the valve rod 221 start to contact, i.e., the valve rod 221 is in the top end position, and the second position VP2 is the position where the valve rod 221 contacts the bottom end position. The stroke length of the valve can be calculated by subtracting the first position VP1 from the second position VP2.

In some embodiments, the valve characteristic parameters further comprise a dead zone length, and the measuring method further comprises: continuing to drive the push rod to push the valve rod and measure an output driving force of the motor in real time, recording a third position of the push rod when the output driving force reaches a preset output force, and calculating the dead zone length of the valve based on the second position and the third position. Based on the required force for fully closing the valve, the valve is deemed to be tightly closed when the output driving force reaches a preset output force.

Specifically, the push rod 217 continues to be driven to move in the closing direction D of the valve 220, and the DC drive current is measured in real time. As shown in FIG. 3, when the output driving force reaches the preset output force, the position of the push rod is where the valve rod 221 stops, and the third position VP3 of the push rod is recorded. The third position VP3 is where the valve rod 221 reaches the stop position. The dead zone length of the valve can be calculated by subtracting the second position VP2 from the third position VP3. In some embodiments, the position sensor can detect the drive shaft position of the motor and convert the drive shaft position into the position of the push rod. In some embodiments, the position sensor 214 can detect the drive shaft position of the motor 213 and convert the drive shaft position into the third position VP3 of the push rod 217.

In some embodiments, the measuring method comprises: repeating the measuring method a plurality of times, and taking the measurement result as a characteristic parameter of the valve when the results of the plurality of times of measurement in the measuring method are consistent. This can improve the accuracy of the measurement result.

The table below shows the measurement results using the measuring method in the embodiments of the present invention. It can be seen that the example measuring methods can be very accurate.

| Type of valve | Rated stroke length | VP1 (mm) | VP2 (mm) | Stroke length (mm) | VP3 (mm) | Dead zone length (mm) |
|---|---|---|---|---|---|---|
| VVP46.20F1.4 | 4.5 mm | 1.810 | 6.399 | 4.589 | 6.845 | 0.445 |
| | | 1.845 | 6.401 | 4.557 | 6.852 | 0.451 |
| | | 1.846 | 6.403 | 4.558 | 6.860 | 0.456 |
| | | 1.858 | 6.404 | 4.547 | 6.866 | 0.462 |
| | | 1.850 | 6.403 | 4.553 | 6.860 | 0.456 |
| VXI46.25/2 | 2.5 mm | 2.194 | 4.703 | 2.509 | 4.933 | 0.230 |
| | | 2.193 | 4.707 | 2.514 | 4.923 | 0.216 |
| | | 2.199 | 4.706 | 2.506 | 4.932 | 0.226 |
| | | 2.205 | 4.708 | 2.503 | 4.933 | 0.225 |
| | | 2.198 | 4.707 | 2.509 | 4.930 | 0.223 |

Some examples include a method for measuring valve characteristic parameters of a valve actuator, wherein a current sensor is used to measure the DC drive current of the motor in real time, and the DC drive current curve is used to determine the characteristic parameter of the valve, thereby making it possible to use the valve actuator in valves of different types.

Figure 4:
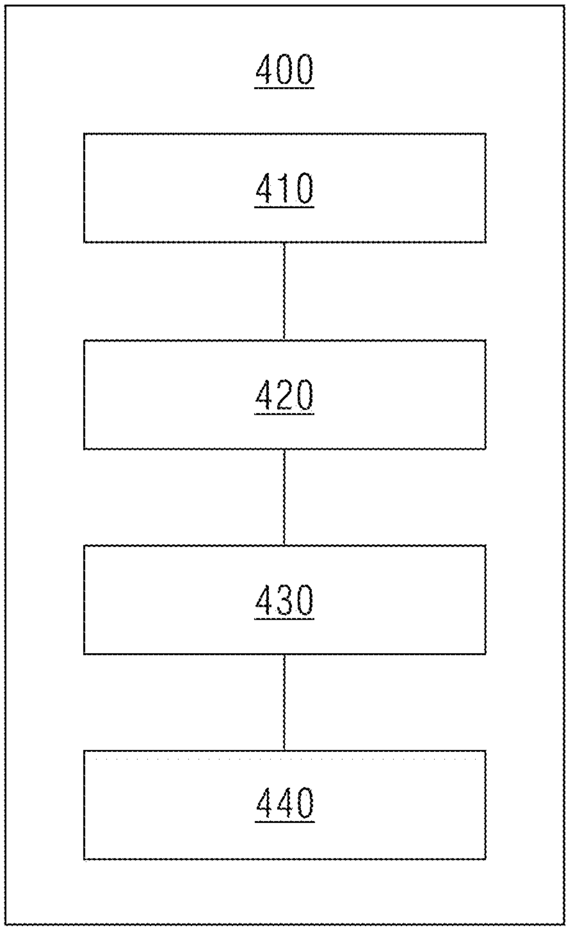
FIG. 4 is a schematic diagram of an example measuring device incorporating teachings of the present disclosure.

Some embodiments include a device for measuring valve characteristic parameters of a valve actuator incorporating teachings of the present disclosure. FIG. 4 is a schematic diagram of an example measuring device 400 according to one embodiment of the. As shown in FIG. 4, the measuring device 400 comprises: a resetting module 410, which resets the push rod to a top end position; a first recording module 420, which, when the push rod is driven to push the valve rod and the DC drive current is measured in real time, records a first position of the push rod at the start of a first abrupt change in the DC drive current when the first abrupt change in the DC drive current is detected and lasts for more than a first preset time period; a second recording module 430, which, when the push rod continues to be driven to push the valve rod and the DC drive current continues to be measured in real time, records a second position of the push rod at the start of a second abrupt change in the DC drive current when the second abrupt change in the DC drive current is detected and lasts for more than a second preset time period; and a calculating module 440, which calculates the stroke length of the valve based on the first position and the second position.

In some embodiments, the valve characteristic parameters further comprise a dead zone length, and the measuring device further comprises: continuing to drive the push rod to push the valve rod and measure an output driving force of the motor in real time, recording a third position of the push rod when the output driving force reaches a preset output force, and calculating the dead zone length of the valve based on the second position and the third position.

In some embodiments, the valve actuator also has a position sensor, which is used to detect the drive shaft position of the motor, and the measuring device comprises: measuring the drive shaft position of the motor by the position sensor and converting the drive shaft position to a position of the push rod.

In some embodiments, the measuring device comprises: measuring the DC drive current in real time, calculating the average rate of change of the DC drive current, and identifying the first and/or the second abrupt change in the first DC drive current when the instantaneous rate of change is greater than the average rate of change.

In some embodiments, the measuring device comprises: repeating the measuring method a plurality of times, and taking the measurement result as a characteristic parameter of the valve when the results of the plurality of times of measurement in the measuring method are consistent.

Some embodiments include a valve actuator, which has a measuring device 400 as described above.

Figure 5:
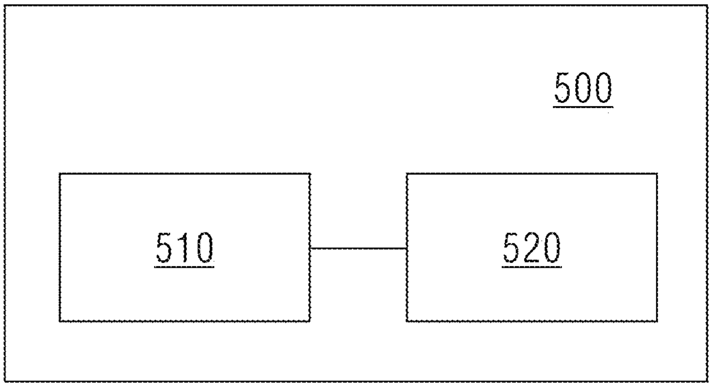
FIG. 5 is a schematic diagram of an example electronic device incorporating teachings of the present disclosure.

Some embodiments include an electronic device 500. FIG. 5 is a schematic diagram of an example electronic device 500 incorporating teachings of the present disclosure. As shown in FIG. 5, the electronic device 500 comprises a processor 510 and a memory 520, with an instruction stored in the memory 520, wherein the instruction, when executed by the processor 510, implements the method 100 as described above.

Some embodiments include a computer-readable storage medium, with a computer instruction stored therein, which, when run, executes one or more of the methods as described herein.

Some aspects of the methods and the devices may be implemented entirely by hardware or entirely by software (including firmware, resident software, microcode, etc.), or by a combination thereof. The above hardware or software may be referred to as a "data block", "module", "engine", "unit", "component" or "system". The processor may be one or more application specific integrated circuits (ASICs), digital signal processors (DSPs), digital signal processing devices (DAPDs), programmable logic devices (PLDs), field programmable gate arrays (FPGAs), processors, controllers, microcontrollers, microprocessors, or a combination thereof. In addition, all aspects may be embodied as a computer product comprising computer-readable program code in one or more computer-readable media. For example, the computer-readable media may include but are not limited to magnetic storage devices (for example, hard disks, floppy disks, magnetic tapes, etc.), optical disks (for example, compact discs (CDs), digital versatile disks (DVDs), etc.), and smart cards and flash memory devices (for example, cards, sticks, key drives, etc.).

Flowcharts are used herein to illustrate the operations performed by the method according to the embodiments of this patent application. It should be understood that these operations are not necessarily performed exactly in the order shown. Instead, the various steps may be processed in the reverse order or simultaneously. At the same time, other operations may be added to these processes, or a step or some steps may be removed from these processes.

It should be understood that, although this description is given according to the various embodiments, it is not necessary that each embodiment contains only one independent technical solution. This way of description is only for clarity, and those skilled in the art should regard the description as a whole. The technical solutions in each embodiment can also be appropriately combined to form other implementations that can be understood by those skilled in the art.

The above are only illustrative specific embodiments of the present disclosure and are not intended to limit the scope thereof. Any equivalent changes, modifications, and combinations made by anyone skilled in the art without departing from the concept and principle shall fall within the scope of the present disclosure.

What is claimed is:

1. A method for measuring valve characteristic parameters of a valve actuator, wherein the valve characteristic parameters comprise a stroke length of the valve and a dead zone length of the valve, wherein the valve actuator comprises a push rod driven by a motor, the push rod pushes a valve rod, the motor is connected to a current sensor to measure a DC drive current of the motor, the method comprising:

resetting the push rod to a top end position;

driving the push rod to push the valve rod;

measuring the DC drive current in real time;

recording a first position of the push rod at the start of a first abrupt change in the DC drive current when the first abrupt change in the DC drive current is detected and lasts for more than a first preset time period;

continuing to drive the push rod to push the valve rod and measure the DC drive current and an output driving force of the motor in real time;

recording a second position of the push rod at the start of a second abrupt change in the DC drive current when the second abrupt change in the DC drive current is detected and lasts for more than a second preset time period;

recording a third position of the push rod when the output driving force reaches a preset output force; and calculating the stroke length of the valve based on the first position and the second position and a dead zone length of the valve based on the second position and the third position.

2. The measuring method as claimed in claim 1, wherein the valve actuator also has a position sensor, which is used to detect the drive shaft position of the motor, and the measuring method further comprises: measuring the drive shaft position of the motor by the position sensor and converting the drive shaft position to a position of the push rod.

3. The measuring method as claimed in claim 1, wherein the measuring method comprises: measuring the DC drive current in real time, calculating an average change rate of the DC drive current, and identifying the first abrupt change and/or the second abrupt change in the DC drive current when an instantaneous change rate is greater than the average change rate.

4. The measuring method as claimed in claim 1, wherein the measuring method comprises: repeating the measuring method a plurality of times, and taking the measurement result as a characteristic parameter of the valve when the results of the plurality of times of measurement in the measuring method are consistent.

5. A device for measuring valve characteristic parameters of a valve actuator, wherein the valve characteristic parameters comprise a stroke length of the valve and a dead zone length of the valve, the valve actuator is used to drive the valve and comprises a push rod driven by a motor, the push rod is adapted to push a valve rod of the valve, and the motor is connected to a current sensor, which is adapted to measure a DC drive current of the motor, wherein the measuring device comprises:

a resetting module configured to reset the push rod to a top end position;

a first recording module configured to, when the push rod is driven, push the valve rod and the DC drive current is measured in real time, records a first position of the push rod at the start of a first abrupt change in the DC drive current when the first abrupt change in the DC drive current is detected and lasts for more than a first preset time period;

a second recording module configured to, when the push rod continues to be driven, push the valve rod and the DC drive current continues to be measured in real time, records a second position of the push rod at the start of a second abrupt change in the DC drive current when the second abrupt change in the DC drive current is detected and lasts for more than a second preset time period;

a third recording module configured to, when the push rod continues to be driven, push the valve rod and an output driving force of the motor is measured in real time, recording a third position of the push rod when the output driving force reaches a preset output force; and a calculating module configured to calculate the stroke length of the valve based on the first position and the second position and a dead zone length of the valve based on the second position and the third position.

6. The measuring device as claimed in claim 5, wherein the valve actuator also has a position sensor used to detect the drive shaft position of the motor; and the measuring device is configured to measure the drive shaft position of the motor by the position sensor, and converting the drive shaft position to a position of the push rod.

7. The measuring device as claimed in claim 5, wherein the measuring device is configured to measure the DC drive current in real time, calculating an average change rate of the DC drive current, and identifying the first abrupt change and/or the second abrupt change in the DC drive current when an instantaneous change rate is greater than the average change rate.

8. The measuring device as claimed in claim 5, wherein the measuring device is configured such that the measuring method further comprises: repeating the functions of the measuring device a plurality of times, and taking the measurement result as a characteristic parameter of the valve when the results of the plurality of times of measurement by the measuring device are consistent.

9. An electronic device comprising:

a processor;

a memory;

wherein valve characteristic parameters comprise a stroke length of the valve and a dead zone length of the valve, wherein the valve actuator comprises a push rod driven by a motor, the push rod pushes a valve rod, the motor is connected to a current sensor to measure a DC drive current of the motor; and an instruction stored in the memory, wherein the instruction, when executed by the processor, causes the processor to:

reset the push rod to a top end position;

drive the push rod to push the valve rod;

measure the DC drive current and an output driving force of the motor in real time;

record a first position of the push rod at the start of a first abrupt change in the DC drive current when the first abrupt change in the DC drive current is detected and lasts for more than a first preset time period;

continue to drive the push rod to push the valve rod and measure the DC drive current in real time;

record a second position of the push rod at the start of a second abrupt change in the DC drive current when the second abrupt change in the DC drive current is detected and lasts for more than a second preset time period;

record a third position of the push rod when the output driving force reaches a preset output force; and calculate the stroke length of the valve based on the first position and the second position and a dead zone length of the valve based on the second position and the third position.

* * * * *